Patented May 18, 1926.

1,584,952

UNITED STATES PATENT OFFICE.

JAMES M. LAUDERDALE, OF MEXIA, TEXAS.

BELT DRESSING.

No Drawing.     Application filed November 16, 1925. Serial No. 69,504.

This invention relates to new and useful compositions, and particularly to compositions for treating transmission belts.

One object of the invention is to provide a composition which will remove dirt, and previously applied dressings from the belt, and at the same time revive the traction qualities of the belt.

Another object is to provide a dressing of this character which will preserve the belt against deterioration.

Another object is to provide a dressing which will increase the holding power of the belt, whereby to prevent slipping.

Other objects and advantages will be apparent from the following description.

The composition comprises the following ingredients: Steam cylinder oil, castor oil, lard oil, resin, and cassia, in the following proportions, thirty (30) gallons of steam cylinder oil, two (2) gallons of castor oil, three (3) pounds of lard oil, fifty (50) pound of resin. The above ingredients are boiled together, being constantly stirred until thoroughly melted and mixed.

The cylinder oil serves as a base for the composition, whereby to give body to the mixture. The castor oil acts as a preservative for the belt to prevent deterioration, while the lard oil serves to clean the belt of dirt, grit, gum, and deposits of other dressings previously used on the belt. The resin acts as a friction means whereby to cause the belt to closely hug the pulley, and thereby prevent slipping thereof.

Some belts will not grip the pulleys as closely as others, and in such a case, I add to the composition oil of cassia, whereby the belt will operate as desired.

A coloring, such as Venetian red, is added to the mixture. Such coloring also adds to the body of the composition.

What is claimed is:

A belt dressing composition comprising the following ingredients in the proportions named: cylinder oil, thirty (30) gallons; castor oil, two (2) gallons; lard oil, three (3) pounds; resin, fifty (50) pounds; and cassia.

In testimony whereof I affix my signature.

JAMES M. LAUDERDALE.